United States Patent [19]

Brothers

[11] Patent Number: 4,640,942
[45] Date of Patent: Feb. 3, 1987

[54] METHOD OF REDUCING FLUID LOSS IN CEMENT COMPOSITIONS CONTAINING SUBSTANTIAL SALT CONCENTRATIONS

[75] Inventor: Lance E. Brothers, Ninnekah, Okla.

[73] Assignee: Halliburton Company, Duncan, Okla.

[21] Appl. No.: 780,055

[22] Filed: Sep. 25, 1985

[51] Int. Cl.$^4$ .................................................. C09K 7/00
[52] U.S. Cl. ..................................... 523/130; 106/97; 264/35
[58] Field of Search .................... 523/130; 106/97; 264/35

[56] References Cited

U.S. PATENT DOCUMENTS

| | | | |
|---|---|---|---|
| 3,692,673 | 9/1972 | Hoke | 210/52 |
| 3,929,741 | 12/1975 | Laskey | 260/79.3 M |
| 4,015,991 | 4/1977 | Persinski et al. | 106/90 |
| 4,107,057 | 8/1978 | Dill et al. | 252/8.55 C |
| 4,309,523 | 1/1982 | Engelhardt et al. | 526/287 X |
| 4,340,525 | 7/1982 | Hubner et al. | 252/8.55 B |
| 4,404,111 | 9/1983 | Le-Khac Bi et al. | 252/8.55 D |
| 4,440,649 | 4/1984 | Loftin et al. | 252/8.5 C |
| 4,502,964 | 3/1985 | Giddings et al. | 252/8.5 C |
| 4,502,966 | 3/1985 | Giddings et al. | 252/8.5 C |
| 4,515,635 | 5/1985 | Rao et al. | 106/90 |

*Primary Examiner*—Paul R. Michl
*Assistant Examiner*—Alex H. Walker
*Attorney, Agent, or Firm*—Robert A. Kent

[57] ABSTRACT

Methods of using salt-tolerant cementing compositions in oil, gas and water well cementing operations including selected fluid loss additives to reduce fluid loss from the composition to the formation are disclosed. Such compositions incorporate certain admixtures of carboxymethylhydroxyethylcellulose or copolymers and copolymer salts of N,N dimethylacrylamide and 2-acrylamido, 2-methyl propane sulfonic acid having mole ratios of between about 1:4 to about 4:1 respectively and a molecular weight such that the Brookfield viscosity reading of a 0.1% aqueous solution of said copolymers at 5 rpm of the U.L. Adapter Spindle is in the range of between about 30 and 250 centipoise together with a copolymer or salt of a copolymer of acrylic acid/AMPS wherein said copolymer has an acrylic acid/AMPS mole ratio of between about 5:1 to about 1:5, and a molecular weight such that the Brookfield viscosity reading of a 10% aqueous solution of said copolymers at 20 rpm of the U.L. Adapter Spindle is in the range of between about 5 and 50 centipoise. Selected concentration levels of the acrylic acid/AMPS copolymer may provide improved fluid-loss control under elevated temperature conditions to cement compositions.

24 Claims, No Drawings

METHOD OF REDUCING FLUID LOSS IN CEMENT COMPOSITIONS CONTAINING SUBSTANTIAL SALT CONCENTRATIONS

FIELD OF THE INVENTION

The present invention relates to an aqueous cementing composition and method of using same in cementing oil and gas wells and the like. More particularly, the present invention concerns incorporation of at least one member selected from the group consisting of carboxymethylhydroxyethylcellulose and copolymers or salts of copolymers of N,N, dimethylacrylamide and 2-acrylamido, 2-methyl propane sulfonic acid together with copolymers or salts of copolymers of acrylic acid and 2-acrylamido, 2-methyl propane sulfonic acid in a hydraulic cement containing substantial salt concentrations for the purpose of reducing fluid loss during cementing operations.

Certain polymer compositions have long been recognized by those skilled in the art of cementing wells in the petroleum industry as cementing additives useful in reducing fluid loss from a slurry of cement and water to the surrounding environment, such as, the formation. These compositions are commonly referred to as "fluid loss additives."

An example of a fluid loss additive for use in an acidizing or fracturing composition is found in U.S. Pat. No. 4,107,057. In the '057 patent a copolymer of a sulfonic-acid modified acrylamide and a polyvinyl crosslinking agent is employed.

In the oil well cementing art, a variety of polymers have been disclosed as useful fluid loss additives for hydraulic oil well cements. For example, U.S. Pat. No. 4,015,991 discloses such a fluid loss additive for a hydraulic cement slurry consisting of hydrolyzed copolymers of acrylamide (AA) and 2-acrylamido, 2-methyl propane sulfonic acid (AMPS)*. However, these AA/AMPS copolymers are useful only in operations where the bottom hole circulating temperature (BHCT) ranges from 90° to 125° F., whereas BHCT ranges encountered in such operations are often outside such a range. Still further, these copolymers have a salt tolerance of only up to about 10%.
*a registered trademark of The Lubrizol Corporation The temperature limitations of the AA/AMPS copolymers, that is, loss of usefulness above about 125° F. BHCT, are believed to be the result of hydrolysis of the amide groups. The carboxylate groups formed by such hydrolysis convert the copolymers to materials which function to retard the setting of the cement and to reduce the compressive strength of the set cement. Further, in the lower portion of the above-mentioned temperature range (between 90° and 100° F.) the AA/AMPS is less effective as a fluid loss additive, requiring inclusion of larger amounts of such additive than at higher temperatures. The inclusion of sufficiently large amount of additive to create an acceptable fluid loss composition often creates viscosity and pumpability problems, since the addition of such copolymer directly affects the resultant slurry rheology. Copolymers of acrylamide and AMPS exhibit high viscosity and poor mixability, resulting in cement slurries having poor pumpability characteristics during cementing operations. Mixability is a subjective term used to describe how well the components in the cement composition wet and mix with each other, as well as the energy required to create a generally homogeneous slurry.

Industry desires a fluid loss additive that has as little effect on compressive strength, set time, viscosity and thickening time as possible; is salt tolerable, that is, does not exhibit substantial loss of effectiveness in the presence of salt; and is chemically stable during cementing operations. Further, such desired fluid loss additive should be compatible with as many other additives and environmental conditions as possible, should be soluble in cement slurries at normal ambient temperatures encountered in oil well cementing operations, as well as continue to provide fluid loss characteristics over broad temperature and cement pH ranges.

U.S. Pat. No. 4,515,635 discloses the use of copolymers of N,N, dimethylacrylamide (NNDMA) and AMPS having monomer ratios of NNDMA to AMPS of 1:4 to 4:1 and selected molecular weights as fluid loss additives for cement compositions. As illustrated in the patent, however, the copolymer fails to provide desired levels of fluid loss control even at relatively high concentrations to cements containing substantial salt concentrations.

It would be desirable to provide additives for use in reducing fluid loss in cement compositions containing substantial salt concentrations where the bottom hole circulating temperatures may range from about 100° F. to in excess of about 400° F. without adversely affecting thickening time, compressive strength or other properties of the cement composition.

SUMMARY OF THE INVENTION

Salt-tolerant cementing compositions for use in oil, gas and water well cementing operations are disclosed. More particularly, such compositions are comprised of water, hydraulic cement, salt in excess of about 10% by weight of water and admixtures of at least one member selected from the group consisting of carboxymethylhydroxyethylcellulose (CMHEC) and selected copolymers or salts of copolymers of N,N, dimethylacrylamide (NNDMA) and 2-acrylamido, 2-methyl propane sulfonic acid (AMPS) together with copolymers and salts of copolymers of acrylic acid and AMPS. The copolymers or salts of the copolymers of NNDMA/AMPS have a monomer molar ratio of between 4:1 and 1:4 and average molecular weights such that a 0.1% aqueous solution of said copolymers has a Brookfield viscosity reading at 5 rpm of the U.L. Adapter Spindle in the range between about 30 and about 250 centipoise. Preferably, the monomer molar ratio is about 1:1.5. The copolymers or salts of copolymers of acrylic acid/AMPS have a monomer molar ratio of between 5:1 to 1:5 and average molecular weights such that a 10% aqueous solution of said copolymers has a Brookfield viscosity reading at 20 rpm of the U.L. Adapter Spindle in the range between about 5 and about 50 centipoise. Preferably, the monomer molar ratio is in the range of from about 5:1 to about 1:1.

The copolymers and salts of the copolymers used in the present invention are relatively stable to hydrolysis over a wide range of temperature and pH. Such copolymers and salts of the copolymers may be admixed in solid form with any dry hydraulic oil field cement or may be added at the time the cement slurry is being prepared, either to the mixing water or to the slurry. Additionally, methods of cementing a conduit in a borehole penetrating an earthen formation by introducing such a cementing composition into the space between such conduit and formation are disclosed.

So that the above-recited features, advantages and objects of the invention, as well as others which will become apparent, are attained and can be understood in detail, more particular description of the invention is set forth below with respect to typical embodiments thereof, but the described embodiments should not be considered limiting of its scope, for the invention may admit to other equally effective embodiments which will be apparent from the description to one of ordinary skill in the art.

DESCRIPTION OF THE PREFERRED EMBODIMENTS

New cementing compositions and methods of using same in oil, gas and water well cementing operations are disclosed. Such compositions are comprised of water, hydraulic cement, salt in excess of about 10% by weight of water and a fluid loss reducing additive comprising an admixture of at least one member selected from the group consisting of CMHEC and a copolymer or salt of a copolymer of NNDMA/AMPS wherein said copolymer has a NNDMA/AMPS mole ratio of between about 1:4 to about 4:1, and a molecular weight such that the Brookfield viscosity reading of a 0.1% aqueous solution of said copolymers at 5 rpm of the U.L. Adapter Spindle is in the range of between about 30 and 250 centipoise together with a copolymer or salt of a copolymer of acrylic acid/AMPS wherein said copolymer has an acrylic acid/AMPS mole ratio of between about 5:1 to about 1:5, and a molecular weight such that the Brookfield viscosity reading of a 10% aqueous solution of said copolymers at 20 rpm of the U.L. Adapter Spindle is in the range of between about 5 and 50 centipoise. More preferably, the Brookfield viscosity reading is between about 130 and about 200 centipoise for the NNDMA/AMPS copolymers and between about 10 and about 20 centipoise for the acrylic acid/AMPS copolymers. Numerous salts of the copolymers can be made. The preferred salts being made by neutralization of the acid form of the AMPS monomer or the copolymers with an alkaline agent such as a source of sodium, calcium, magnesium, ammonium ions or the like. Such alkaline agents can comprise, for example, sodium hydroxide, calcium hydroxide, ammonia, magnesium hydroxide and the like.

Although the amount of copolymers present generally may be varied, the CMHEC or NNDMA/AMPS copolymers generally are admixed with the cementing composition in an amount of from about 0.1 to about 1.0 percent by weight of dry cement. Preferably, the compounds are admixed with the cement in an amount of from about 0.25 to about 0.75 percent and, most preferably, from about 0.25 to about 0.5 percent by weight of dry cement. The acrylic acid/AMPS copolymers are admixed with the cementing composition in an amount of from about 0.1 to about 3.0 percent by weight of dry cement. Preferably, the acrylic acid/AMPS copolymers are admixed with the cement in an amount of from about 0.25 to about 2.5 percent and, most preferably, from about 0.25 to about 2.0 percent by weight of dry cement. The amount of each polymer admixed in the fluid loss additive will depend upon the amount of salt present, the temperature level to be experienced, rheological considerations, the average molecular weight of the copolymers and other additives present. It also should be understood that larger proportionate amounts of the copolymers may be utilized, but such quantities are unnecessary to achieve the desired fluid loss control.

The individual constituents of the fluid loss additives of the present invention generally are effective at reducing fluid loss in non-salt containing cementing compositions. The behavior of the various constituents of the additives, however, in salt-containing cementing compositions are very much different.

The constituents of the fluid loss additives of the present invention are generally ineffective individually at reducing fluid loss even at high concentrations from salt-containing cementing compositions. However, they demonstrate a surprising ability in combination to substantially reduce fluid loss from the salt-containing cement compositions. Such reduction in fluid loss from the cement compositions is substantially in excess of any additive effect which the various compounds comprising the fluid loss additive may experience even when utilized at substantially greater individual concentration levels when admixed with cement and as such is totally unexpected.

The fluid loss additives of the present invention are effective in reducing fluid loss from cementing compositions containing in excess of about 10% salt by weight of water. The fluid loss additives are particularly effective at reducing fluid loss at elevated temperatures, that is, generally above 125° F. from cementing compositions containing in excess of 15% salt by weight of water up to the saturated salt concentration level.

The salt-tolerant cementing compositions of the present invention are useful in oil, gas and water well cementing operations since such compositions have reduced fluid loss to the surrounding formation. Such compositions are used to cement a conduit penetrating a permeable earthen formation via introducing such composition into the space between such conduit and such formation and allowing the composition to harden.

The copolymers and copolymer salts used in the present invention may be manufactured in accordance with various well know free-radical techniques. However, in the present invention new solution polymerization techniques were employed to obtain polymer solutions of NNDMA and AMPS containing 10% by weight of solids. Such polymerization techniques are described in patent application Ser. No. 592,666 filed Mar. 23, 1984, now abandoned, by S. Prabhakara Rao. The mole ratios of the NNDMA and AMPS monomers are variable, but for the purposes of this invention should not vary in ratio amounts greater than 4 to 1 in either direction. Those copolymers which are useful in the present invention are disclosed in U.S. Pat. No. 4,515,635, the entire disclosure of which is incorporated herein by reference.

The salts of the various copolymers may be produced in accordance with the various well known techniques. The salt may be formed, for example, by reaction of an alkaline agent with either the AMPS monomer before polymerization or the NNDMA/AMPS copolymer or acrylic acid/AMPS copolymer. The salt may be formed with any alkaline agent which does not adversely react with the monomers of the copolymer or the other constituents present in the cementing composition.

Surprisingly, it has been found that the fluid-loss additive composition utilized in the method of the present invention provides fluid-loss control to the salt-containing cement slurry while also providing enhanced dispersant properties. The enhanced properties are found to occur when the acrylic acid/AMPS copolymer has an average molecular weight below about 10,000. Preferably, the acrylic acid/AMPS copolymers of the present invention will have an average molecular weight in the range of from about 5000 to about 9000 and, most preferably, from about 6000 to about 8000.

To illustrate the unique benefits of the method of the present invention, the following examples are presented.

EXAMPLE I

A number of materials were tested as potential fluid loss additives for cements containing substantial salt concentrations, including NNDMA/AMPS copolymers, acrylic acid/AMPS copolymers and carboxymethylhydroxyethylcellulose. These tests were performed at 180° F. using cement slurries comprising Class H cement, 35% silica flour by weight of dry cement, 45% graded particle size hematite by weight of dry cement and 47% water by weight of dry cement. Sufficient sodium chloride was admixed with the cement composition to form a saturated solution. The various additives identified in the following Table I then were mixed with samples of the cement slurries. The additive containing cement slurries were mixed in an atmospheric consistometer which was preheated to test temperature and stirred for twenty minutes. The atmospheric consistometer is a non-pressurized device that simulates a cementing pumping process via movement of the consistometer can about a paddle. Temperature can be varied but pressure is atmospheric. Fluid loss was measured at 1000 psi through a 325 mesh screen in cc/30 min. The foregoing test procedure is more fully outlined in API Spec 10, 1st Ed., Jan. 1982, entitled "API Specification for Materials and Testing for Well Cements" which is incorporated herein by reference. The results of these fluid loss tests are provided in Table I.

The Table I test results indicate that certain admixtures of copolymers are effective fluid loss additives under static 180° F. temperature conditions.

TABLE I

Fluid Loss Tests on Various Polymer Additives Temperature 180° F.

| Sample No. | Acrylic Acid/ AMPS[4] (% by Wt. of Dry Cement) | NNDMA/ AMPS (% by Wt. of Dry Cement) | CMHEC (% by Wt. of Dry Cement) | Atmospheric Consistometer (Bc)[3] Initial | 20 Min | Fluid Loss (cc/ 30 min) |
|---|---|---|---|---|---|---|
| 1 | 1.0 | 0 | 0 | 8 | 10 | 713 |
| 2 | 1.5 | 0 | 0 | 5 | 9 | 570 |
| 3 | 0 | 0.25 | 0 | 100+ | 31 | —[1] |
| 4 | 0 | 0 | 0.25 | 45 | 19 | 1560 |
| 5 | 1.0 | 0.25 | 0 | 11 | 9 | 56 |
| 6 | 1.0 | 0.50 | 0 | 13 | 9 | 24 |
| 7 | 1.0 | 0 | 0.25 | 12 | 9 | 68 |
| 8 | 0.6 | 0 | 0.25 | 18 | 11 | 83 |
| 9 | 0.2 | 0 | 0.25 | 22 | 10 | 602 |
| 10 | 0.4 | 0 | 0.25 | 19 | 10 | 134 |
| 11 | 0.5 | 0 | 0.25 | 19 | 12 | 102 |
| 12 | 1.0 | 0 | 0.50 | 20 | 13 | 22 |
| 13 | 1.0 | 0 | 0.75 | —[2] | — | — |

[1]Blew out in manner to render unmeasurable
[2]Would not mix
[3]Bearden units of consistency
[4]Molar ratio acrylic acid/AMPS of 1:1

The data clearly illustrates the lack of effectiveness of the various individual constituents of the fluid loss additive of the present invention when employed in cementing compositions containing in excess of 10% salt by weight of dry cement. The data also illustrates the effectiveness of the fluid loss additive of the present invention in providing fluid loss control of less than about 100 cc/30 minutes in comparison to other combinations of the constituents outside the ranges described by Applicant. It should be noted that as the amount of the various copolymer additives are increased, the rheology of the slurry also increased. From an operations standpoint, slurries having a rheology measured above about 12–15 Bearden units of consistency on the atmospheric consistometer become less desirable and increasingly less desirable as that number increases.

EXAMPLE II

The test procedure of Example I is repeated utilizing an acrylic acid/AMPS copolymer having a molar ratio of 4:1. The results of the test are set forth in Table II, below:

TABLE II

Fluid Loss Tests on Various Polymer Additives Temperature 180° F.

| Sample No. | Acrylic Acid/ AMPS[1] (% by Wt. of Dry Cement) | NNDMA/ AMPS (% by Wt. of Dry Cement) | CMHEC (% by Wt. of Dry Cement) | Atmospheric Consistometer (Bc) Initial | 20 Min | Fluid Loss (cc/ 30 min) |
|---|---|---|---|---|---|---|
| 1 | 2.0 | 0.25 | 0 | 11 | 11 | 56 |
| 2 | 2.0 | 0.50 | 0 | 20 | 16 | 46 |
| 3 | 2.0 | 0 | 0.10 | 11 | 11 | 52 |
| 4 | 1.5 | 0 | 0.10 | 10 | 10 | 67 |
| 5 | 1.0 | 0 | 0.10 | 10 | 10 | 139 |
| 6 | 0.75 | 0.25 | 0 | 10 | 10 | 269 |
| 7 | 0.75 | 0 | 0.25 | 13 | 10 | 83 |

[1]Molar ratio acrylic acid/AMPS of 4:1

The data of Tables I and II clearly illustrates the operability of the method of the present invention utilizing acrylic acid/AMPS copolymers having varying molar ratios.

EXAMPLE III

To illustrate the effectiveness of the composition of the present invention in comparison to a known acrylamide/AMPS copolymer utilized as a fluid-loss additive, the following tests were performed. The tests were performed at 180° F. using cement slurries comprising Class H cement, 35% silica flour by weight of dry cement, 45% graded particle size hematite by weight of dry cement and 47% water by weight of dry cement. Sufficient sodium chloride was admixed with the cement composition to form a saturated solution. The various additives identified in the following Table III then were mixed with samples of the cement slurries and tested as described in Example I together with 0.25% carboxymethylhydroxyethylcellulose by weight of dry cement. The results of the fluid loss tests are set forth in Table III, below.

TABLE III

| Sample No. | Additive | Additive Concentration (% by Wt. of Dry Cement) | Atmospheric Consistometer, Bc Initial | 20 Min | Fluid Loss (cc/ 30 min) |
|---|---|---|---|---|---|
| 1 | Acrylamide/ AMPS copolymer molar ratio 4:1[1] | 1.0 | 45 | 27 | 187 |
| 2 | Acrylic acid/ | 1.0 | 13 | 10 | 79 |

TABLE III-continued

| Sample No. | Additive | Additive Concentration (% by Wt. of Dry Cement) | Atmospheric Consistometer, Bc Initial | Atmospheric Consistometer, Bc 20 Min | Fluid Loss (cc/30 min) |
|---|---|---|---|---|---|
| 3 | AMPS copolymer molar ratio 1:1 Acrylic acid/AMPS copolymer molar ratio 4:1 | 1.0 | 10 | 9 | 81 |

[1]Described in U.S. Pat. No. 4,015,991

The data clearly illustrates the benefits of utilizing the method of the present invention in cement slurries containing significant concentrations of salt.

Surprisingly, it has been found that when the bottom hole circulating temperatures of the well to be cemented is in excess of about 300° F. and, even more particularly above 350° F., that the acrylic acid/AMPS copolymer of the fluid-loss additive of the present invention, when utilized at a concentration in excess of about 2 percent by weight of cement, can provide improved fluid-loss control to a cement composition containing salt in excess of about 10% by weight of the mixing water. More particularly, the acrylic acid-/AMPS copolymer having an averge molecular weight below 10,000 and, preferably, an average molecular weight in the range of from about 5,000 to about 9,000, and, most preferably, 6,000 to about 8,000, and a molar ratio in the range of from about 1:5 to 5:1 and, preferably, from about 5:1 to about 1:1 when present in an amount of from about 2 percent to about 4 percent by weight of dry cement can provide significantly improved fluid-loss control to a cement slurry containing salt in an amount in excess of 10% by weight of the mixing water when emplaced in a formation having a temperature above 300° F. without adversely affecting cement setting. It is to be understood that larger quantities of the acrylic acid/AMPS copolymer may be utilized, however, the larger quantities generally do not improve the effectiveness of the copolymer as a fluid-loss control additive. The acrylic acid/AMPS copolymer of the present invention is particularly effective at reducing fluid loss from cement compositions which are saturated with salt which are emplaced in formations at temperatures in excess of about 300° F.

While that which previously is considered to be the preferred embodiment of the invention has been described, it is to be understood that variations and modifications which will become apparent to those individuals skilled in the art can be made in this invention without departing from the spirit or scope thereof.

What is claimed is:

1. A method of cementing a conduit in a borehole penetrating an earthen formation by introducing a salt-tolerant cementing composition into the space between said conduit and said formation, wherein said cementing composition comprised:
   cement;
   water containing in excess of about 10% salt by weight of water, and
   a fluid loss additive comprising an admixture of (i) a copolymer or copolymer salt of acrylic acid and 2-acrylamido, 2-methyl propane sulfonic acid or acid salt thereof having a mole ratio of from about 1:5 to about 5:1 and a molecular weight also such that a 10% aqueous solution of said copolymer has a Brookfield viscosity reading at 20 rpm of the U.L. Adapter Spindle in the range of between about 5 to about 50 centipoise present in an amount of from about 0.1% to about 3.0% by weight of dry cement and (ii) at least one member selected from the group consisting of carboxymethylhydroxyethylcellulose and a copolymer or copolymer salt of N,N, dimethylacrylamide and 2-acrylamido, 2-methyl propane sulfonic acid or acid salt thereof having a mole ratio from about 1:4 to about 4:1 and a molecular weight also such that a 0.1% aqueous solution of said copolymer has a Brookfield viscosity reading at 5 rpm of the U.L. Adapter Spindle in the range of between about 30 and about 250 centipoise present in an amount of from about 0.1% to about 1.0% by weight of dry cement.

2. The method of claim 1 wherein the Brookfield viscosity reading of said N,N dimethylacrylamide/2-acrylamido, 2-methyl propane sulfonic acid copolymer is in the range of from about 130 to about 200.

3. The method of claim 1 wherein said water contains in excess of about 15% salt by weight water.

4. The method of claim 1 wherein the mole ratio of N,N, dimethylacrylamide to 2-acrylamido, 2-methyl propane sulfonic acid in said copolymer is about 1:1.5.

5. The method of claim 1 wherein said copolymer salts are formed by reaction of the polymer units individually or as a copolymer with an alkaline agent capable of producing a salt containing ions of at least one member selected from the group consisting of sodium, calcium, magnesium and ammonium ions.

6. The method of claim 1 wherein the Brookfield viscosity reading of said acrylic acid/2-acrylamido, 2-methyl propane sulfonic acid copolymer is in the range of from about 10 to about 20 centipoise.

7. The method of claim 1 wherein the mole ratio of acrylic acid to 2-acrylamido, 2-methyl propane sulfonic acid is in the range of from about 5:1 to about 1:1.

8. The method of claim 1 wherein said copolymer of N,N dimethylacrylamide/2-acrylamido, 2-methyl propane sulfonic acid is present in an amount of from about 0.25% to about 0.75% by weight of dry cement.

9. The method of claim 1 wherein said copolymer of N,N dimethylacrylamide/2-acrylamido, 2-methyl propane sulfonic acid is present in an amount of from about 0.25% to about 0.5% by weight of dry cement.

10. The method of claim 1 wherein said copolymer of acrylic acid/2-acrylamido, 2-methyl propane sulfonic acid is present in an amount of from about 0.25% to about 2.5% by weight of dry cement.

11. The method of claim 1 wherein said copolymer of acrylic acid/2-acrylamido, 2-methyl propane sulfonic acid is present in an amount of from about 0.25% to about 2.0% by weight of dry cement.

12. A method of cementing a conduit penetrating a permeable earthen formation comprising:
   introducing a cementing composition into the space between said conduit and said formation, said cementing composition comprising
   cement,
   water containing in excess of about 10% salt by weight of water, and
   a fluid loss additive comprising an admixture of (i) a copolymer or copolymer salt of acrylic acid and 2-acrylamido, 2-methyl propane sulfonic acid or acid salt thereof having a mole ratio of from about 1:5 to about 5:1 and a molecular weight also such that a 10% aqueous solution of said copolymer has a Brookfield viscosity reading at 20 rpm of the U.L. Adapter Spindle in the range of between about 5 to about 50 centipoise present in an amount of from about 0.1% to about 3.0% by weight of dry cement and (ii) at least one member selected from the group consisting of carboxymethylhydroxyethylcellulose and a copolymer or copolymer salt of N,N, dimethylacrylamide and 2-acrylamido, 2-methyl propane sulfonic acid or acid salt thereof having a mole ratio from about 1:4 to about 4:1 and a molecular weight also such that a 0.1% aqueous solution of said copolymer has a Brookfield viscosity reading at 5 rpm of the U.L. Adapter Spindle in the range of between about 30 and about 250 centipoise present in an amount of from about 0.1% to about 1.0% by weight of dry cement; and allowing said cementing composition to harden to cement said conduit into said space.

13. The method of claim 12 wherein the Brookfield viscosity reading of said N,N dimethylacrylamide/2-acrylamido, 2-methyl propane sulfonic acid copolymer is in the range of from about 130 to about 200 centipoise.

14. The method of claim 12 wherein said water contains in excess of about 15% salt by weight water.

15. The method of claim 12 wherein the mole ratio of N,N, dimethylacrylamide to 2-acrylamido, 2-methyl propane sulfonic acid in said copolymer is about 1:1.5.

16. The method of claim 12 wherein the Brookfield viscosity reading of said acrylic acid/2-acrylamido, 2-methyl propane sulfonic acid copolymer is in the range of from about 10 to about 20 centipoise.

17. The method of claim 12 wherein the mole ratio of acrylic acid to 2-acrylamido, 2-methyl propane sulfonic acid is in the range of from about 5:1 to about 1:1.

18. The method of claim 12 wherein said copolymer of N,N dimethylacrylamide/2-acrylamido, 2-methyl propane sulfonic acid is present in an amount of from about 0.25% to about 0.75% by weight of dry cement.

19. The method of claim 12 wherein said copolymer of acrylic acid/2-acrylamido, 2-methyl propane sulfonic acid is present in an amount of from about 0.25% to about 2.5% by weight of dry cement.

20. The method of claim 12 wherein said copolymer of acrylic acid/2-acrylamido, 2-methyl propane sulfonic acid is present in an amount of from about 0.25% to about 2.0% by weight of dry cement.

21. A method of cementing a conduit penetrating a permeable earthen formation comprising:
  introducing a cementing composition into the space between said conduit and said formation, said cementing composition comprising:
    cement;
    water containing in excess of about 10% salt by weight of water; and
    a copolymer or copolymer salt of acrylic acid and 2-acrylamido, 2-methyl propane sulfonic acid or salt thereof having a mole ratio of from about 1:5 to about 5:1 and an average molecular weight below 10,000, present in an amount in excess of about 2 percent by weight of dry cement; and
  allowing said cementing composition to set within said space.

22. The method of claim 21 wherein said copolymer has an average molecular weight in the range of from about 5,000 to about 9,000.

23. The method of claim 21 wherein said copolymer is present in an amount of from about 2 to about 4 percent by weight of dry cement.

24. The method of claim 21 wherein the temperature of said formation is in excess of about 300° F. and said water is saturated with salt.

* * * * *